United States Patent
Ritter

(10) Patent No.: US 6,906,757 B2
(45) Date of Patent: Jun. 14, 2005

(54) METHOD AND SYSTEM FOR ENHANCING RESOLUTION IN A VIDEO SIGNAL BY DIGITAL SIMULATION OF ANALOG H-SWEEP VELOCITY MODULATION

(75) Inventor: David Wayne Ritter, San Jose, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 461 days.

(21) Appl. No.: 09/974,481

(22) Filed: Oct. 9, 2001

(65) Prior Publication Data

US 2003/0067561 A1 Apr. 10, 2003

(51) Int. Cl.7 .............................................. H04N 5/21
(52) U.S. Cl. ........................ 348/626; 348/572; 341/61
(58) Field of Search ............................... 348/625–629, 348/704, 572, 571, 573; 341/61, 155; 345/13, 212, 213; 382/266–269

(56) References Cited

U.S. PATENT DOCUMENTS

| 4,132,947 A | * | 1/1979 | Weischedel et al. ..... 324/76.18 |
| 4,308,585 A | * | 12/1981 | Jordan ........................ 358/1.16 |
| 4,518,994 A | * | 5/1985 | Schnitzler .............. 375/240.01 |
| 4,843,465 A | * | 6/1989 | Yuasa et al. ........... 375/240.12 |
| 5,663,615 A | * | 9/1997 | Ogino ......................... 315/371 |
| 6,005,632 A | * | 12/1999 | Cahill, III .................... 348/465 |
| 6,043,848 A | * | 3/2000 | Richter ....................... 348/465 |
| 6,057,793 A | * | 5/2000 | Gong et al. ................. 341/143 |
| 6,549,244 B1 | * | 4/2003 | Ueyama ..................... 348/626 |

* cited by examiner

Primary Examiner—Victor R. Kostak
(74) Attorney, Agent, or Firm—Steven L. Nichols; Rader, Fishman & Grauer PLLC

(57) ABSTRACT

A digital video signal processing system monitors the rate of change of the digital video signal to detect large rates of change that indicate the presence of an object edge in the video image. Upon detection of such an edge, the digital signal is sampled at a variable rate so that more sampling is performed immediately before and after the sudden change in the signal and less sampling is performed during the change. The result is that the edge in the video image occupies less pixels and, therefore, is more clear and defined that would be the case otherwise. Consequently, the appearance of the video image is enhanced. This can be considered as the digital analogue of analog H-sweep velocity modulation.

10 Claims, 5 Drawing Sheets

METHOD AND SYSTEM FOR ENHANCING RESOLUTION IN A VIDEO SIGNAL BY DIGITAL SIMULATION OF ANALOG H-SWEEP VELOCITY MODULATION

FIELD OF THE INVENTION

The present invention relates to video signal processing. More particularly, the present invention relates to the field of enhancing the resolution and appearance of video images displayed from a video signal on a television, video monitor or other display device. The present invention provides a method and system for enhancing resolution in a video image by processing the underlying digital video signal with a digital simulation of analog H-sweep velocity modulation.

BACKGROUND OF THE INVENTION

Video programming is very popular and important in modern society and is widely used for a number of purposes such as education and entertainment. Because of its importance and popularity, there are many means and methods in use for distributing and recording video programming. For example, video programming is broadcast to television receivers over the air and through cable television systems. Video programming is also recorded and distributed on video tapes and disks. Video programming may also be transmitted as streaming data or a compressed file that moves over a computer network, such as the Internet. These many different methods and means of storing and distributing video programming attest to its importance and popularity.

In addition to wanting a large selection of readily available video programming, consumers and viewers also want video programming that is of the highest possible quality. The images as displayed on televisions, video monitors and other display devices should be as crisp and clear as possible. Consequently, much technology is devoted to devices and methods that enhance the resolution and/or appearance of a video image as displayed on a monitor or display device.

Frequently, the resolution or appearance of the image is limited, not by the abilities of the display device, but by the quality and quantity of information in the video signal that is used by the display device to create the video images. For example, television signals were originally analog signals and analog signals are still used in over-the-air broadcasting. However, digital signals can carry more data and consequently can provide a better, higher-resolution image. For this reasons, cable television systems frequently use digital signals to transmit high-quality video images. Similarly, DVDs (Digital Video Discs) use digital data to store high quality video images. DVDs are widely recognized as providing higher picture quality during playback than video tapes that use an analog video signal.

In any given video image, the resolution and resulting quality of the image is most evident at the edges of objects in the image. Frequently, an object is a different color, shade or texture than its background or otherwise has a visual transition at its edges. As used herein and in the appended claims, the term "visual transition" refers to any boundary between areas in a video image that is distinguishable to viewers as having one or more different visual characteristics.

If the quality of a video image is low, the image will tend to blur particularly around the visual transition, e.g., in color, shade, etc., that defines the edges of the object in the image. Consequently, the overall appearance of an image can be greatly enhanced by making the edges of objects in the image appear sharp and well defined. The higher the resolution of an image, the easier it is to define object edges and other visual transitions within the image.

Techniques for improving the appearance of object edges in video images using analog signals have been known. However, digital signals have traditionally relied simply on providing additional image data for all parts of the image to provide an adequate appearance, including across those visual transition that occur at object edges.

Consequently, there is a need in the art for a method and system for further enhancing the appearance of a video image generated from a digital video signal at the edges of objects and other visual transitions within the image.

SUMMARY OF THE INVENTION

The present invention meets the above-described needs and others. Specifically, the present invention provides a method and system for further enhancing the appearance of a video image generated from a digital video signal at the edges of objects within the image.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a signal processing system for a digital video signal including: an absolute rate-of-change detector receiving an incoming digital video signal; and a programmable sample rate filter also receiving the incoming digital video signal. A control signal from the absolute rate-of-change detector controls the programmable sample rate filter in accordance with the rate-of-change of the digital video signal. Preferably, a signal delay delays the digital video signal as received by the programmable sample rate filter.

A digital sampler receives the incoming digital video signal through the programmable sample rate filter. The programmable sample rate filter adjusts the time base of the digital video signal such that the sampler samples more data from the digital video signal before and after an abrupt change in the video signal detected by the rate-of-change detector and less data from the digital video signal during the abrupt change. The result is that the abrupt change, i.e., an object edge or visual transition in the encoded video image, occupies fewer pixels and is, therefore, sharp and more clearly defined. The abrupt change is identified as exceeding a predetermined threshold.

The foregoing system of the present invention enhances the appearance of visual transitions in the video image that are vertical or have a vertical component. The principles of the present invention can also be adapted to a system that enhances both vertical and horizontal visual transitions in the video image. Such a system preferably further includes: a line memory controlled by a memory controller for storing one or more horizontal lines of an image carried by the digital video signal; and a second absolute rate-of-change detector that also receives the incoming digital video signal. The second absolute rate-of-change detector compares a current horizontal line of image data vertically with corresponding portions of a previous line or lines of image data supplied to the second absolute rate-of-change detector from the line memory.

A control signal from the second absolute rate-of-change detector further controls the programmable sample rate filter in accordance with a vertical rate-of-change of the digital video signal between horizontal lines of image data. The digital sampler that receives the incoming digital video signal through the programmable sample rate filter samples more data from the digital video signal before and after an abrupt change in the video signal detected by the first rate-of-change detector or the second rate-of-change detector and less data from the digital video signal during the abrupt change, the abrupt change being identified as exceeding a predetermined threshold.

The present invention also encompasses the methods of making and using a system exemplified by that described above. For example, the present invention encompasses a method of processing a digital video signal by (1) detecting a rate of change of the digital video signal; and (2) sampling more data from the digital video signal before and after an abrupt change in the video signal and less data from the digital video signal during the abrupt change, the abrupt change being identified as exceeding a predetermined threshold. Preferably, the increase in sampling before and after the abrupt change is balanced by the decrease in sampling during the abrupt change.

The present invention also encompasses embodiments implemented as computer software. For example, the present invention encompasses computer-readable instructions stored on a medium for storing computer-readable instructions for causing a computer or process to (1) detect a rate of change of an incoming digital video signal (serially or between succeeding horizontal data lines); and (2) sample more data from the digital video signal before and after an abrupt change in the video signal and less data from the digital video signal during the abrupt change, the abrupt change being identified as exceeding a predetermined threshold.

BRIEF DESCRIPTION OF THE DRAWINGS

The accompanying drawings illustrate preferred embodiments of the present invention and are a part of the specification. Together with the following description, the drawings demonstrate and explain the principles of the present invention.

Throughout the drawings, identical elements are designated by identical reference numbers.

DETAILED DESCRIPTION OF THE PREFERRED EMBODIMENTS

The present invention can be advantageously embodied in a digital video signal processing system in which the rate of change of the signal is monitored to detect relatively large rates of change that indicate the presence of an object edge or visual transition in the video image. Upon detection of such an edge, the digital signal is sampled at a variable rate so that more sampling is performed immediately before and after the sudden change in the signal and less sampling is performed during the change. The result is that the edge in the video image occupies less pixels and, therefore, is more clear and defined than would be the case otherwise. In other words, the visual transition has a shorted rise time in the sampled signal. Consequently, the appearance of the video image is enhanced. This can be considered as the digital analogue of analog H-sweep velocity modulation.

Using analog video signals, the appearance of object edges in the resulting video images (where the edge has at least some vertical component) has been enhanced by an analog H-sweep velocity modulation process. In other words, where the analog video signal represents an object edge, the signal has a substantial change that represents the visual transition that is the object edge. The idea is to compress or accelerate the display of the signal over this change (velocity modulation) so that the change occurs as quickly as possible within the displayed image. When the change in the signal, which represents an object edge, is displayed quickly, the visual transition that is the edge also occurs quickly providing a sharply defined edge and an improved image. The present invention can be used to simulate or approximate this process in a digital video signal regime that has heretofore had no such process for enhancing the appearance of a video image at object edges within the image.

Using the drawings, the preferred embodiments of the present invention will now be explained.

Figure 1:
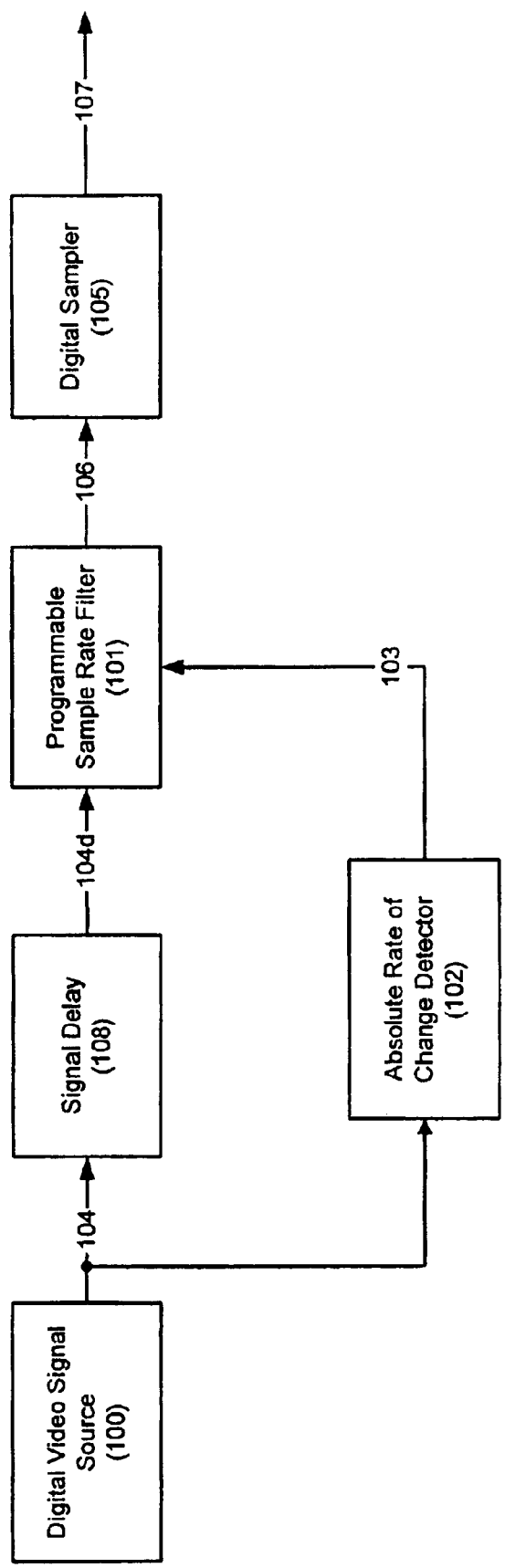
FIG. 1 is a block diagram of a preferred digital video signal processing system according to the present invention for enhancing vertical object edges in a resulting video image.

FIG. 1 is a block diagram of a preferred digital video signal processing system, according to the present invention, for enhancing vertical object edges in a resulting video image. The system first receives a digital video signal (104) from a digital video signal source (100). The digital video signal source (100) can be any source of a digital video signal including, but not limited to, a cable or satellite television system, a DVD player, a Video CD player, a CD ROM drive, etc.

The digital video signal (104) is fed to a delay (108) and to an absolute rate-of-change detector (102). The absolute rate-of-change detector (102) monitors abrupt changes in the video signal that indicate the edge of an object or other visual transition in the video image carried by the signal. Video signals typically carry each horizontal line of the video image in succession. Consequently, when an abrupt change is detected by the detector (102), it indicates an object edge or other visual transition in the video image that is vertical or has a vertical component and thus crosses the horizontal line of the image then being carried by the signal (104).

When the rate-of-change detector (102) identifies an object edge in the image carried by the video signal (104), the detector (102) outputs a control signal (103) to a programmable sample rate filter (101). The filter (101) adjusts the time base of the signal. Consequently, as will be explained in more detail below, the signal is sampled to produce pixel information in such a way that increased sampling occurs before and after the object edge, i.e., the abrupt change in the signal, and less sampling occurs during the object edge.

The result is that the edge occupies fewer pixels in the resulting image. Consequently, the edge appears more sharp and defined, i.e., having a higher resolution, than would be the case otherwise. In effect, the rise time in that portion of the digital signal that encodes the object edge or other visual transition is minimized.

The signal delay (108) delays the input of the digital signal (104) to the programmable sample rate filter (101) to allow the rate-of-change detector (102) to sense an object edge or other visual transition encoded in the signal and control the programmable sample rate filter (101) accordingly. Consequently, the signal delay (108) receives the incoming digital video signal (104) and outputs a delayed digital video signal (104d) to the programmable sample rate filter (101).

As indicated above, the programmable sample rate filter (101) adjusts the time base of the video signal (104d) so that more sampling of the signal occurs before and after an object edge or other visual transition and less sampling occurs during the transition. This will be explained in more detail in reference to FIG. 2. The programmable sample rate filter (101) may operate as a controllable signal delay so that the portions of the video signal (104d) that immediately precede and follow an object edge or other visual transition are output as a slower than standard rate, while the portion of the video signal (104d) that encodes the transition is output at a faster than normal rate.

This time-base adjusted video signal (106) can be output by the programmable sample rate filter (101) to a digital sampler (105). The sampler (105) preferably samples the signal (106) at a constant rate and outputs a sampled signal (107) derived from the incoming signal (106). Because the sampler (105) samples the incoming signal (106) at a constant rate, where the incoming signal (106) has been slowed by the programmable sample rate filter (101) (i.e., immediately before and after a visual transition) more samples (i.e., more pixels in the resulting video image) will be taken from those slowed portions of the signal. Conversely, where the incoming signal (106) has been sped up by the programmable sample rate filter (101) (i.e., during the abrupt change indicating a visual transition) fewer samples (i.e., fewer pixels in the resulting video image) will be taken from those sped up portions of the signal.

In this way, the appearance of the edge or other visual transition, comprises fewer pixels and is made sharp and defined with a higher effective resolution. This, in turn, improves the appearance of the entire resulting video image. These principles of the present invention will be explained in more detail below with reference to FIG. 2.

Figure 2:
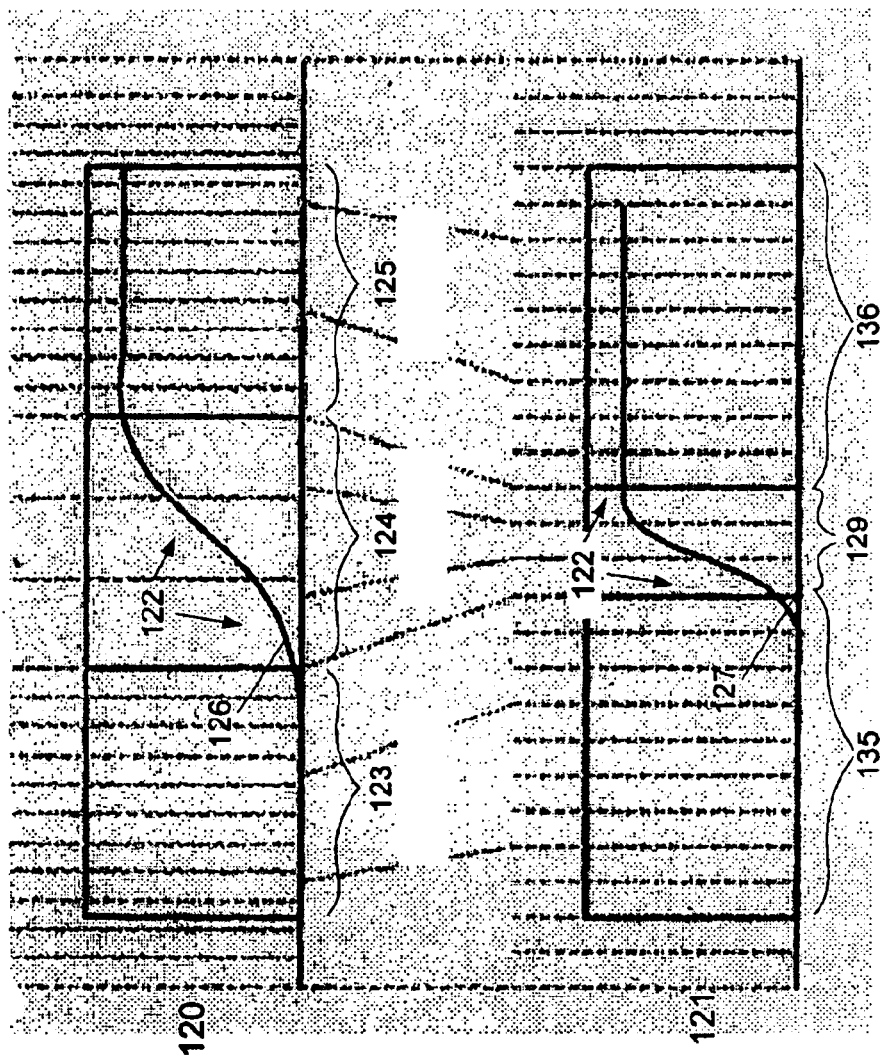
FIG. 2 is a signal diagram illustrating the operation and effect of the system illustrated in FIG. 1 on an incoming video signal.

FIG. 2 is a signal diagram illustrating the operation and effect of the system illustrated in FIG. 1 on an incoming video signal. In particular, FIG. 2 illustrates the operation and effect of the programmable sample rate filter (101) and the digital sampler (105).

The upper portion of FIG. 2 (120) illustrates the effect of the programmable sample rate filter (101) on the digital video signal (126). As shown in FIG. 2 (120), the digital video signal (126) includes an abrupt change (122). This change (122) indicates the presence of an object edge or other visual transition in the image encoded in the video signal (126). A threshold rate-of-change can be predetermined that will be considered by the rate-of-change detector (102; FIG. 1) as indicating a visual transition.

As described above, the programmable sample rate filter (101; FIG. 1) adjusts the time-base of the signal, effectively feeding the signal to the digital sampler (105; FIG. 1) more quickly or slowly than a standard speed, to govern the sampling of the signal by the sampler (105; FIG. 1). Thus, the portion of the signal (123) just before the abrupt change (122) and the portion of the signal (125) just after the abrupt change (122) are output to the digital sampler (105; FIG. 1) at a decelerated rate, effectively lengthening the time that that signal portion (123 or 125) is being fed to the sampler (105; FIG. 1). In contrast, the portion of the signal (124) that contains the abrupt change (122) is output to the digital sampler (105; FIG. 1) at an accelerated rate, effectively decreasing the time that that signal portion (124) is fed to the sampler (105; FIG. 1).

The results of this modulation are illustrated in the lower portion (121) of FIG. 2. The lower portion (121) of FIG. 2 illustrates how the sampler (105; FIG. 1), sampling at a constant rate, sees the modulated signal from the filter (101; FIG. 1). As shown in the lower portion (121) of FIG. 2, the signal (127), as seen by the sampler (105; FIG. 1), is compressed at the portion (129) containing the abrupt change (122) (i.e., the visual transition) and is elongated before (135) and after (136) that compressed portion (129). Consequently, as the sampler (105; FIG. 1) samples the signal (127) at a constant rate, more samples (i.e., more pixels) will be taken from the elongated portions (135, 136) and less from the compressed portion (129).

In this way, the display of the object edge or other visual transition, represented by the change (122), comprises fewer pixels and is made sharp and defined with a higher effective resolution. As indicated above, this, in turn, improves the appearance of the entire resulting video image.

It should be noted that the increase in sampling before (135) and after (136) the abrupt change (122) in the signal (127) should be balanced by the decrease in sampling during the portion of the signal (127) containing the abrupt change (122). This balance allows the resulting pixel data taken from the signal (127) to form a number of pixels that properly fit and form a horizontal line of the image, as though no special modification had been made in the sampling of the signal. Consequently, the control signal (103; FIG. 1) should have a zero mean (i.e., no DC).

Figure 3:
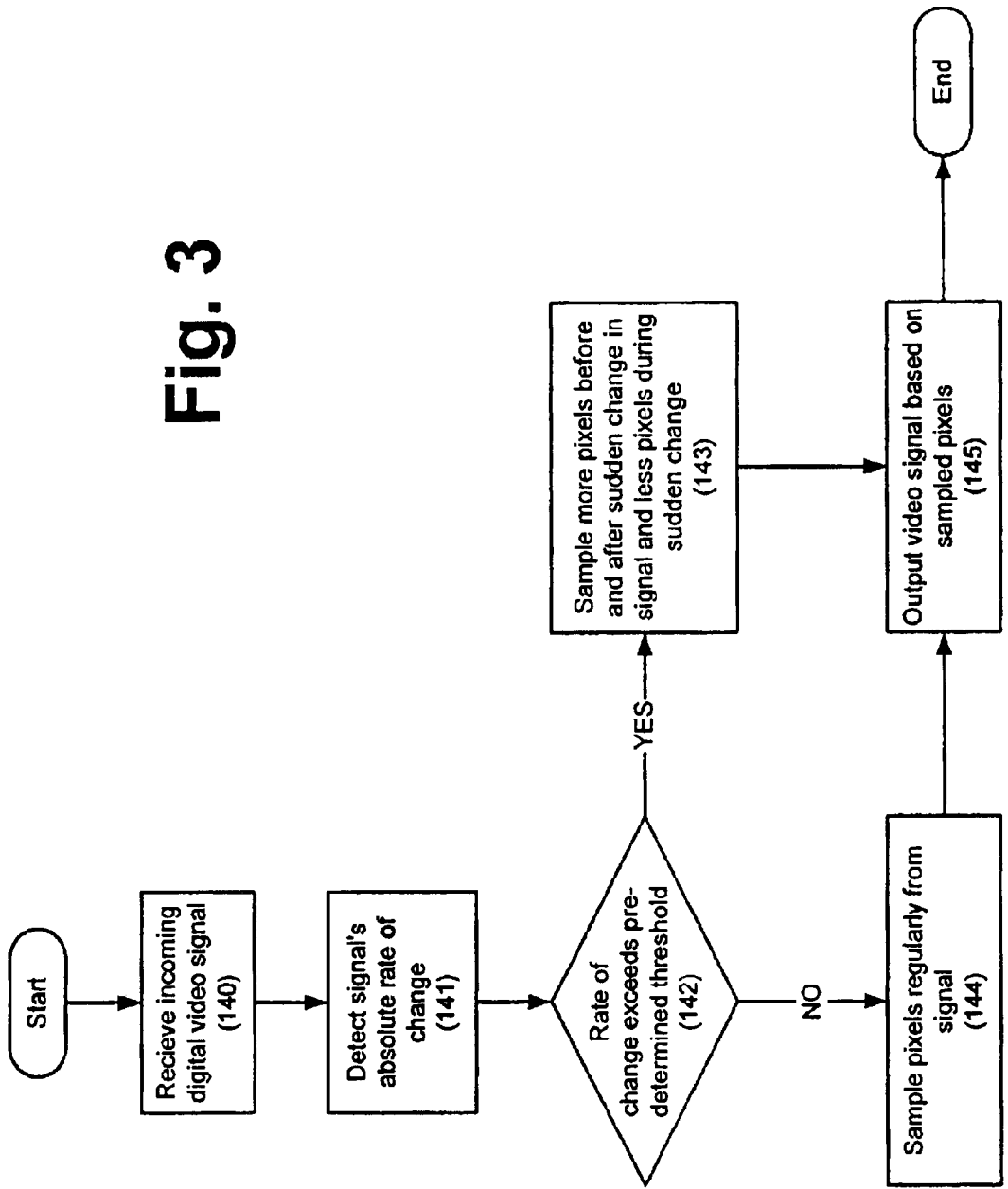
FIG. 3 is a flowchart illustrating a preferred method of enhancing the appearance of vertical edges in a video image resulting from a digital video signal according to the present invention. The flowcharts presented herein also represent software or firmware implementations of the present invention.

FIG. 3 is a flowchart illustrating a preferred method of enhancing the appearance of vertical edges and other visual transitions in a video image resulting from a digital video signal according to the present invention. This method can be implemented by, for example, the system illustrated in FIG. 1. However, this method can also be carried out by an appropriate piece of software running on a processor and using the data of the incoming video signal as input data. The flowchart of FIG. 3 serves as a disclosure of and outline for such a software implementation of the invention. Given the disclosure of FIG. 3, one of ordinary skill in the programming arts could prepare a software implementation of the present invention.

As shown in FIG. 3, the process first receives the incoming digital video signal (140). Next, the signal's absolute rate of change is monitored (141). As explained above, at portions of the signal that encode an object edge or visual transition within the video image carried by the signal, an abrupt increase or decrease will occur in the signal's rate of change. Thus by detecting an absolute rate of change, the sudden increase or decrease in the rate of change will be detected. When that increase or decrease exceeds a predetermined threshold (142), the presence of an object edge or other visual transition in the image is indicated.

If no such jump in the rate of change is detected, the pixel data is sampled from the video signal at regular intervals to decode the video image (144). However, when an object edge or visual transition is detected, as indicated by a quick jump in the rate of change of the signal, more pixel data is sampled from the signal before and after the sudden jump and less pixel data is sampled during the sudden jump (143). An output signal based on the adjusted sampling is then generated (145).

Figure 4:
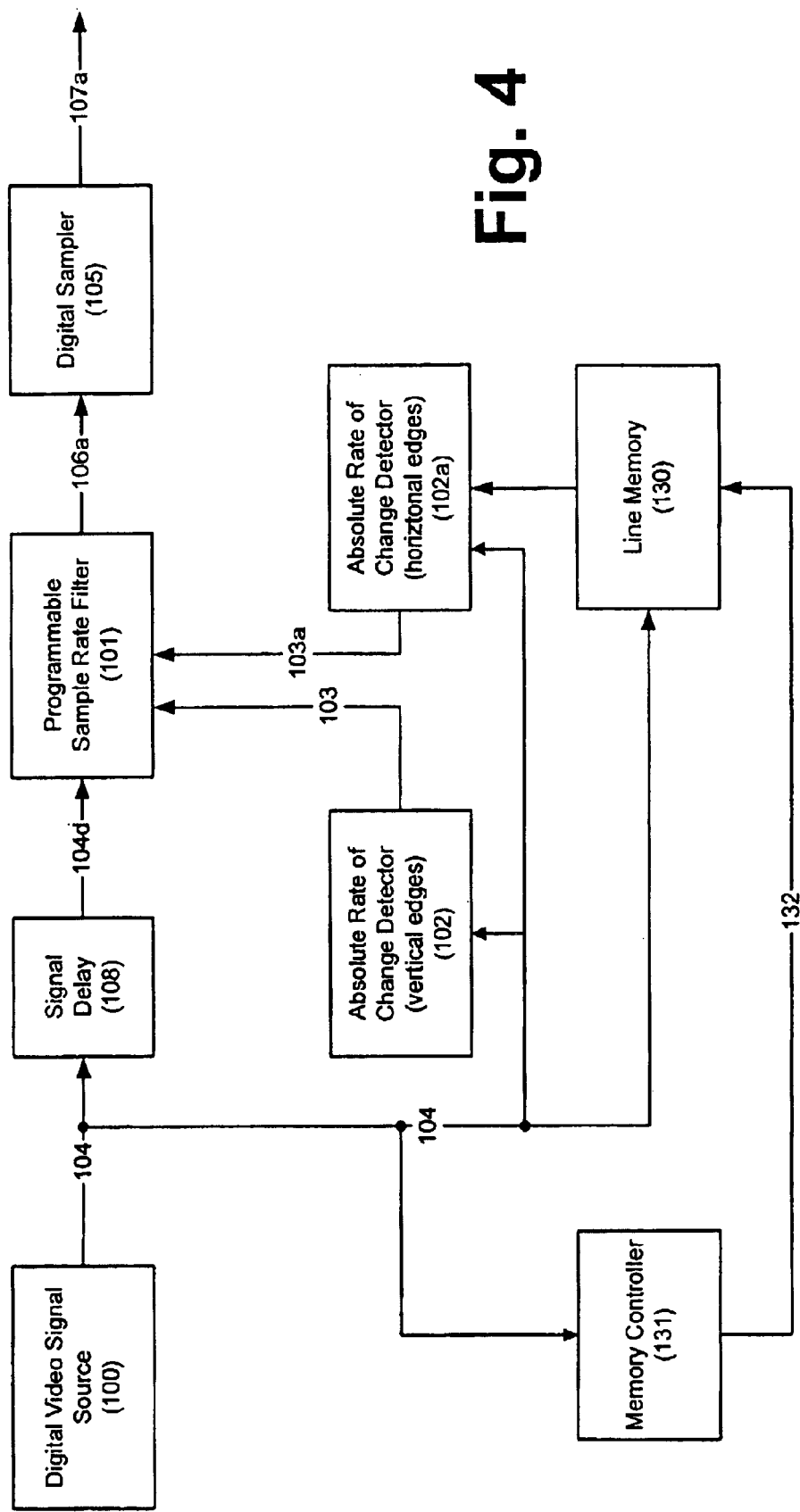
FIG. 4 is a block diagram of a preferred digital video signal processing system according to the present invention for enhancing both horizontal and vertical object edges in a resulting video image.

FIG. 4 is a block diagram of a preferred digital video signal processing system according to the present invention for enhancing both horizontal and vertical object edges and other visual transitions in a resulting video image. As will be explained with reference to FIG. 4, the principles of the present invention can be applied to enhance object edges and visual transitions that run both vertically and horizontally in a video image. The previous embodiment, described above, enhances the appearance of vertical edges or transitions, or edges/transitions with a vertical component, that run across the horizontal lines into which a video image is typically broken for transmission.

As shown in FIG. 4, the incoming digital video signal (104) is again received from a digital video source (100). As described above with reference to FIG. 3, the signal (104) is fed to a delay (108) as well as to an absolute rate-of-change detector (102). This detector (102) will detect high rates of change that indicate vertical object edges or other visual transitions, or transitions with a substantial vertical component, in the video image of the video signal (104). As before, the rate-of-change detector (102) will output a control signal (103) to a programmable sample rate filter (101) that will control the output of the video signal to a digital sampler (105) in the manner described above. This will enhance the clarity and definition of that vertical object edge or visual transition in the resulting video image.

In addition to this, the system of FIG. 4 also includes components for enhancing the clarity and definition of horizontal object edges and visual transitions in the resulting video image. To this end, the incoming video signal (104) is also fed to a memory controller (131), a line memory (130) and a second absolute rate-of-change detector (102a).

Receiving the incoming video signal (104), the memory controller (131) can determine when each line of the video image starts and ends within the video signal (104). The memory controller (141) will then control the line memory (130) to capture each successive line or a series of lines of the video image data from the incoming signal (104), the incoming signal (104) also being fed into the line memory (130).

When a line of the video image is incoming in the video signal (104), it is fed to both the first and second rate-of-change detectors (102, 102a). At the same time, a control signal (132) from the memory controller (131) causes the line memory (130) to output the previously received line or lines of the video image stored in the line memory (130) to the second rate-of-change detector (102a). The second rate-of-change detector (102a) can thus make a vertical comparison of matching segments of successive horizontal lines of the video image and determine a vertical rate of change. This vertical rate of change will jump when a horizontal object edge or other horizontal visual transition occurs in the video image.

Using the same operational principles as the first rate-of-change detector (102), the second rate-of-change detector (102a) outputs a signal (103a) to the programmable sample rate filter (101). Consequently, the programmable sample rate filter (101) can further adjust the output of the video signal (106a) to the digital sampler (105) so that in both vertical and horizontal directions, the sampler (105) samples more from portions of the signal before a vertical or horizontal object edge and less from portions of the signal containing a vertical or horizontal edge. The resulting signal (107a) provides a video image with enhanced definition and effective resolution over object edges and linear transitions as well as point highlights.

Figure 5:
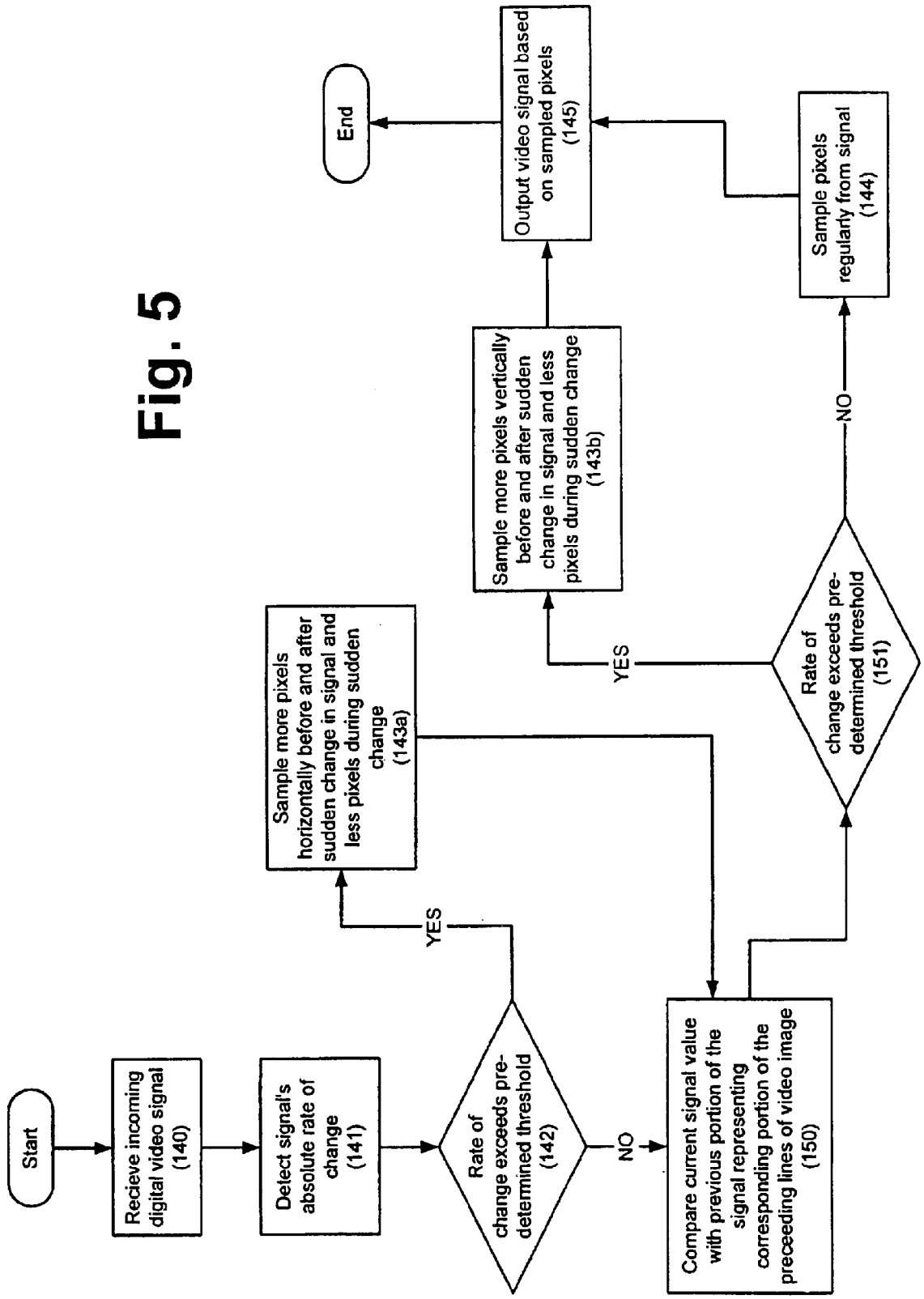
FIG. 5 is a flowchart illustrating a preferred method of enhancing the appearance of both horizontal and vertical edges in a video image resulting from a digital video signal according to the present invention.

FIG. 5 is a flowchart illustrating a preferred method of enhancing the appearance of both horizontal and vertical edges in a video image resulting from a digital video signal according to the present invention. This method may be implemented by the system illustrated in FIG. 4, for example. However, this method can also be carried out by an appropriate piece of software running on a processor and using the data of the incoming video signal as input data. The flowchart of FIG. 5 serves as a disclosure of and outline for such a software implementation of the invention. Given the disclosure of FIG. 5, one of ordinary skill in the programming arts could prepare a software implementation of the present invention.

As shown in FIG. 5, the process first receives the incoming digital video signal (140). Next, the signal's absolute rate of change is monitored (141). As explained above, at portions of the signal that encode an object edge or visual transition within the video image carried by the signal, an abrupt increase or decrease will occur in the signal's rate of change. Thus by monitoring an absolute rate of change, the sudden increase or decrease in the rate of change will be detected. When that increase or decrease exceeds a predetermined threshold (142), the presence of a vertical object edge or other visual transition in the image is indicated. When such a vertical object edge or visual transition is detected, as indicated by a quick jump in the rate of change of the signal, more pixel data is sampled from the signal before and after the sudden jump and less pixel data is sampled during the sudden jump (143a).

Next, the process compares the current signal values for a horizontal line of the video image with corresponding portions of a previous line or lines (150). This is done to detect a vertical rate of change that exceeds a pre-determined threshold (151) signaling the presence of a horizontal object edge or visual transition in the video image being carried by the signal. Where such a vertical comparison of signal values indicates the presence of a horizontal object edge, more pixels are sampled vertically before and after the portion of the signal encoding the horizontal object edge and less pixels are sampled from that portion of the signal encoding the horizontal object edge or other visual transition (143b). When no vertical or horizontal edges in the video image are detected, pixel data is sampled from the video signal on a regular basis (144).

An output signal based on the adjusted sampling is then generated (145). As noted above, this output signal, when displayed, will provide enhanced appearance and effective resolution for vertical and horizontal object edges and visual transitions within the image.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A signal processing system for a digital video signal comprising:

an absolute rate-of-change detector receiving an incoming digital video signal; and a programmable sample rate filter also receiving said incoming digital video signal;

wherein a control signal from said absolute rate-of-change detector controls said programmable sample rate filter in accordance with a rate-of-change of said digital video signal such that said programmable sample rate filter adjusts a time base of said digital video signal, slowing output of said digital video signal before and after an abrupt change in said video signal detected by said rate-of-change detector and speeding up output of said digital video signal during said abrupt change, said abrupt change being identified as exceeding a predetermined threshold.

2. The system of claim 1, further comprising a digital sampler receiving said incoming digital video signal through said programmable sample rate filter, wherein, as said programmable sample rate filter adjusts said time base of said digital video signal, said sampler samples more data from said digital video signal before and after said abrupt change in said video signal detected by said rate-of-change detector and less data from said digital video signal during said abrupt change.

3. The system of claim 1, further comprising a signal delay for delaying said digital video signal as received by said programmable sample rate filter.

4. A signal processing system for a digital video signal comprising:

an absolute rate-of-change detector receiving an incoming digital video signal;

a programmable sample rate filter also receiving said incoming digital video signal, wherein a control signal from said absolute rate-of-change detector controls said programmable sample rate filter in accordance with a rate-of-change of said digital video signal;

a line memory controlled by a memory controller for storing one or more horizontal lines of an image carried by said digital video signal; and a second absolute rate-of-change detector that also receives said incoming digital video signal;

wherein said second absolute rate-of-change detector compares a current horizontal line of image data vertically with corresponding portions of a previous line or lines of image data supplied to said second absolute rate-of-change detector from said line memory.

5. The system of claim 4, wherein a control signal from said second absolute rate-of-change detector further controls said programmable sample rate filter in accordance with a vertical rate-of-change of said digital video signal between horizontal lines of image data.

6. The system of claim 5, further comprising a digital sampler receiving said incoming digital video signal through said programmable sample rate filter, wherein said programmable sample rate filter adjusts a time base of said digital video signal such that said sampler samples more data from said digital video signal before and after an abrupt change in said video signal detected by said first rate-of-change detector or said second rate-of-change detector and less data from said digital video signal during said abrupt change, said abrupt change being identified as exceeding a predetermined threshold.

7. A method of processing a digital video signal comprising:

detecting a rate of change of said digital video signal;

sampling more data from said digital video signal before and after an abrupt change in said video signal and less data from said digital video signal during said abrupt change, said abrupt change being identified as exceeding a predetermined threshold;

adjusting a time-base of said digital video signal with a programmable sample rate filter before said digital video signal is sampled; and sampling said time-base adjusted digital video signal at a constant rate.

8. The method of claim 7, further comprising controlling said programmable sample rate filter with a control signal from an absolute rate-of-change detector that also receives said digital video signal and performs said detecting of said rate of change of said video signal.

9. The method of claim 8, further comprising delaying said digital video signal as received by said programmable sample rate filter.

10. A system for processing a digital video signal comprising:

means for detecting a rate of change of said digital video signal;

means for sampling more data from said digital video signal before and after an abrupt change in said video signal and less data from said digital video signal during said abrupt change, said abrupt change being identified as exceeding a predetermined threshold;

means for adjusting a time-base of said digital video signal; and means for sampling said time-base adjusted digital video signal at a constant rate.

* * * * *